United States Patent
Jiang

(10) Patent No.: US 11,438,950 B2
(45) Date of Patent: Sep. 6, 2022

(54) REPORTING OF INFORMATION REGARDING DENIAL OF CONNECTION REQUEST

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co, . Ltd., Beijing (CN)

( * ) Notice: Subject to any disclaimer, the term of this patent is extended or adjusted under 35 U.S.C. 154(b) by 0 days.

(21) Appl. No.: 15/733,821

(22) PCT Filed: Jun. 5, 2018

(86) PCT No.: PCT/CN2018/089993
§ 371 (c)(1),
(2) Date: Nov. 30, 2020

(87) PCT Pub. No.: WO2019/232698
PCT Pub. Date: Dec. 12, 2019

(65) Prior Publication Data
US 2021/0219365 A1 Jul. 15, 2021

(51) Int. Cl.
*H04W 76/18* (2018.01)
*H04W 24/10* (2009.01)
(Continued)

(52) U.S. Cl.
CPC ............ *H04W 76/18* (2018.02); *H04W 24/10* (2013.01); *H04W 48/08* (2013.01); *H04W 84/042* (2013.01)

(58) Field of Classification Search
CPC ... H04W 12/122; H04W 24/10; H04W 48/08; H04W 76/18; H04W 76/19;
(Continued)

(56) References Cited

U.S. PATENT DOCUMENTS

| | | |
|---|---|---|
| 9,693,254 B2 | 6/2017 | Jung et al. |
| 9,767,807 B2 | 9/2017 | Bhaskaran |

(Continued)

FOREIGN PATENT DOCUMENTS

| | | |
|---|---|---|
| CN | 102215499 A | 10/2011 |
| CN | 103458466 A | 12/2013 |

(Continued)

OTHER PUBLICATIONS

English Translation of the Written Opinion of the International Search Authority in the International Application No. PCT/CN2018/089993, dated Feb. 25, 2019, (4p).

(Continued)

*Primary Examiner* — Philip Sobutka
(74) *Attorney, Agent, or Firm* — Arch & Lake LLP

(57) ABSTRACT

The present disclosure relates to an information reporting method, apparatus, terminal, and storage medium. The method comprises: a terminal sends a connection request, the connection request requesting to establish a wireless connection with an access network device in a network; in response to occurrence of a denial event corresponding to the connection request, the terminal records event information of the denial event, the denial event referring to an event of denial of response to the connection request; and, after the terminal successfully accesses the network, the terminal sends to the network event reporting information generated on the basis of the event information.

28 Claims, 4 Drawing Sheets

(51) Int. Cl.
*H04W 48/08* (2009.01)
*H04W 84/04* (2009.01)

(58) Field of Classification Search
CPC ... H04W 84/042; H04W 76/00; H04W 76/27; H04W 36/0033; H04W 36/0079; H04L 63/1458
See application file for complete search history.

(56) References Cited

U.S. PATENT DOCUMENTS

| | | | |
|---|---|---|---|
| 2015/0187359 A1 | 7/2015 | Bhaskaran | |
| 2015/0195167 A1 | 7/2015 | Lo | |
| 2015/0281991 A1 | 10/2015 | Jung et al. | |
| 2018/0070238 A1 | 3/2018 | Agarwal et al. | |
| 2019/0239095 A1* | 8/2019 | Ouyang | G06N 3/04 |

FOREIGN PATENT DOCUMENTS

| | | |
|---|---|---|
| CN | 104429153 A | 3/2015 |
| CN | 104737615 A | 6/2015 |
| CN | 104756589 A | 7/2015 |
| CN | 105743960 A | 7/2016 |
| CN | 107734530 A | 2/2018 |
| EP | 2906014 A2 | 8/2015 |
| WO | 2013187144 A1 | 12/2013 |
| WO | 2014067108 A1 | 5/2014 |
| WO | 2016144806 A2 | 9/2016 |

OTHER PUBLICATIONS

3rd Generation Partnership Project;Technical Specification Group Radio Access Network;Evolved Universal Terrestrial Radio Access (E-UTRA); Radio Resource Control (RRC); Protocol specification (Release 15), 3GPP TS 36.331 V15.1.0 (Mar. 2018), (786p).
International Search Report of PCT Application No. PCT/CN2018/089993 dated Feb. 25, 2019 and English translation (4p).
First Office Action of the Chinese Application No. 201880000588.7 dated May 6, 2021 with English translation, (15p).
Second Office Action of the Chinese Application No. 201880000588.7, dated Nov. 2, 2021 with English translation, (16p).
Supplementary European Search Report in the European Application No. 18921427.3, dated Dec. 16, 2021, (7p).
First Office Action of the Indian Application No. 202147000109, dated Jan. 4, 2022, (6p).

* cited by examiner

REPORTING OF INFORMATION REGARDING DENIAL OF CONNECTION REQUEST

CROSS-REFERENCE TO RELATED APPLICATION

This application is a national phase application based on PCT/CN2018/089993, filed Jun. 5, 2018, the content of which is incorporated herein by reference in its entirety.

TECHNICAL FIELD

The present disclosure relates to the field of communication, and more particularly, to a method and apparatus for reporting information, a terminal, and a storage medium.

BACKGROUND

When initiates a connection request to a Base Station (BS), a terminal may be subject to a security threat referred to as a Denial of Service (DoS) attack. A DoS attack in general is when a pseudo BS receives a connection request sent by a terminal and sends a denial message to the terminal to prevent the terminal from accessing a network, such that the terminal cannot access the network for a long time.

SUMMARY

Embodiments herein provide a method and apparatus for reporting information, a terminal, and a storage medium. The technical solution is as follows.

According to a first aspect of the present disclosure, a method for reporting information includes: sending, by a terminal, a connection request, the connection request requesting to establish a radio connection with an access network device in a network; in response to occurrence of a denial event corresponding to the connection request, recording, by the terminal, event information corresponding to the denial event, the denial event referring to an event of denial of response to the connection request; and after the terminal has successfully attained access to the network, sending, by the terminal, to the network, an event report generated according to the event information.

According to a second aspect of the present disclosure, an apparatus for reporting information is applicable to a terminal. The apparatus includes a request sending module, an event recording module, and an information reporting module. The request sending module is adapted to sending a connection request. The connection request is adapted to requesting establishment of a radio connection with an access network device in a network. The event recording module is adapted to, in response to occurrence of a denial event corresponding to the connection request, recording event information corresponding to the denial event. The denial event refers to an event of denial of response to the connection request. The information reporting module is adapted to, after the terminal has successfully attained access to the network, sending, to the network, an event report generated according to the event information.

According to a third aspect of the present disclosure, a terminal includes a processor and memory. The memory is adapted to storing an instruction executable by the processor. The processor, when executing the instruction, causes the terminal to perform acts comprising: sending a connection request, the connection request requesting to establish a radio connection with an access network device in a network; in response to occurrence of a denial event corresponding to the connection request, recording event information corresponding to the denial event, the denial event referring to an event of denial of response to the connection request; and after the terminal has successfully attained access to the network, sending, to the network, an event report generated according to the event information.

According to a fourth aspect herein, a non-transitory computer-readable storage medium has stored thereon a computer program which, when executed by a processor, implements the method of the first aspect.

A technical solution herein may include beneficial effects as follows.

With a technical solution of the present disclosure, in response to occurrence of a denial event corresponding to the connection request, a terminal records event information corresponding to a denial event. Having successfully attained access to the network, the terminal sends, to the network, an event report generated according to the event information. Accordingly, the network learns, according to the event report, a possible security threat to the network, such as a DoS attack. Compared to manual collection and troubleshooting, a network collects information on a DoS attack reported by a terminal, reducing labor and time cost, improving efficiency.

The above general description and detailed description below are but exemplary and explanatory, and do not limit the subject disclosure.

BRIEF DESCRIPTION OF THE ACCOMPANYING DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
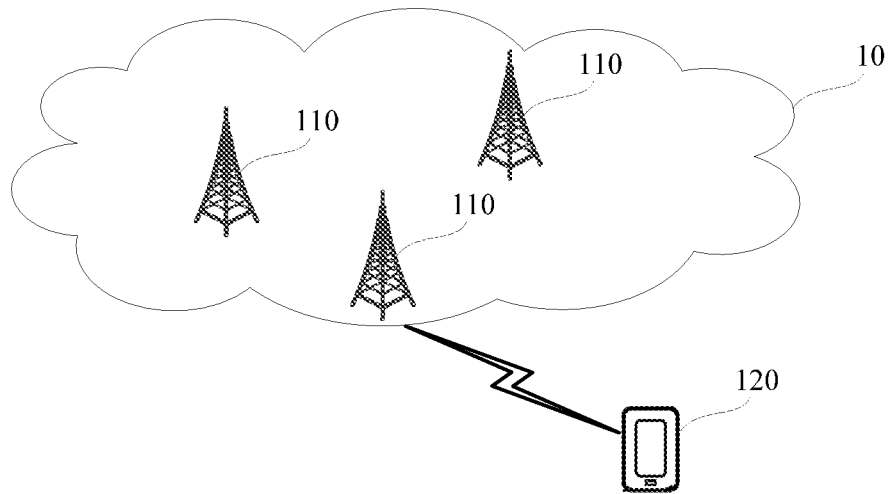
FIG. 1 is a diagram of a scene of application according to an embodiment.

Embodiments (examples of which are illustrated in the accompanying drawings) are elaborated below. The following description may refer to the accompanying drawings, in which identical or similar elements in two drawings are denoted by identical reference numerals unless indicated otherwise. Implementations set forth in the following embodiments do not represent all implementations in accordance with the subject disclosure. Rather, they are mere examples of the apparatus (i.e., device/equipment/terminal) and method in accordance with certain aspects of the subject disclosure as recited in the accompanying claims.

A network architecture and a service scene are illustrated herein to illustrate a technical solution herein more clearly, and do not form a limitation to a technical solution herein. A person having ordinary skill in the art may know that with evolution of the network architecture and emergence of a new service scene, a technical solution herein may also apply to a similar technical problem.

FIG. 1 is a diagram of a scene of application according to an embodiment. The scene of application may include multiple access network devices 110 and a terminal 120. An access network device 110 may be deployed in a Radio Access Network (RAN) 10.

In general, there may be multiple terminals 120. One or more terminals 120 may be distributed in a cell managed by an access network device 110.

An access network device 110 and a terminal 120 may communicate with each other through an air interface such as a cellular technology. A technical solution herein may apply to a Long Term Evolution (LTE) system, as well as an evolved LTE system such as an LTE-Advanced (LTE-A) system, a 5th Generation (5G) system (also referred to as New Radio, NR, system), etc.

Herein terms "network" and "system" are often used alternately. A person having ordinary skill in the art may understand meanings thereof, though.

A terminal herein may include various handheld devices, onboard devices, wearable devices, computing devices, etc., capable of radio communication, other processing devices connected to a radio modem, various forms of User Equipment (UE), Mobile Stations (MS), terminal devices, etc. For ease of description, an aforementioned device may be collectively referred to as a terminal.

Herein an access network device in a RAN may be a Base Station (BS). The BS may be an apparatus deployed in a RAN to provide a radio communication function to a terminal. The BS may include various forms of macro BSs, micro BSs, relays, access points, etc. In systems using different radio access technologies, devices having BS functions may be given different names. For example, such a device may be referred to as an evolved NodeB (eNB or eNodeB) in an LTE system, a Node B in a 3rd Generation (3G) system, etc. The name "BS" may change as communication technologies evolve. For ease of description, herein a device providing a radio communication function to a terminal may be collectively referred to as an access network device.

Figure 2:
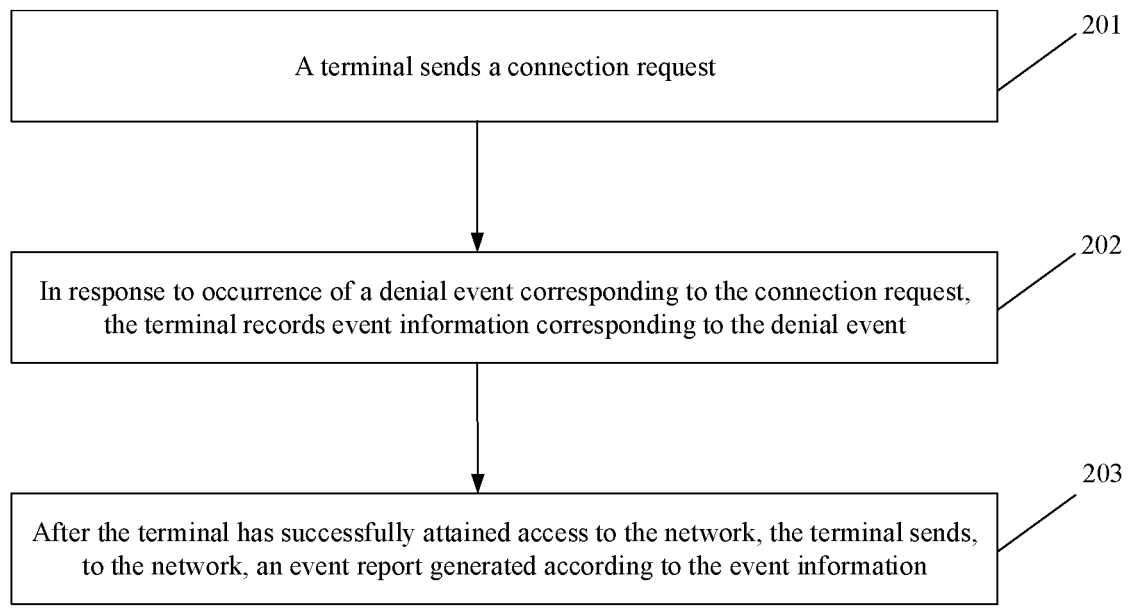
FIG. 2 is a flowchart of a method for reporting information according to an embodiment.

FIG. 2 is a flowchart of a method for reporting information according to an embodiment. The method may apply to the scene of application in FIG. 1. The method may include steps as follows.

In step 201, a terminal sends a connection request.

The connection request is adapted to requesting establishment of a radio connection with an access network device in a network. For example, the terminal may send the connection request to a first access network device in the network to request establishment of a radio connection with the first access network device in the network. After a radio connection with an access network device has been established, the terminal may transmit signaling and/or data through the radio connection. In one or more embodiments, the radio connection may be a Radio Resource Control (RRC) connection.

In one or more embodiments, the connection request may be any one of a connection establishment request, a connection reestablishment request, a connection restoration request, etc. A terminal in an idle state may send a connection establishment request requesting establishment of a radio connection. A terminal in a connected state may send a connection reestablishment request requesting reestablishment of a radio connection. A terminal in an inactive state may send a connection restoration request requesting restoration of an established radio connection.

That is, when the terminal is in the idle state, the terminal may send a connection establishment request to the network to request establishment of a radio connection. When the terminal is in the connected state, the terminal may send a connection reestablishment request to the network to request reestablishment of a radio connection. When the terminal is in the inactive state, the terminal may send a connection restoration request to the network to request restoration of an established radio connection.

In step 202, in response to occurrence of a denial event corresponding to the connection request, the terminal may record event information corresponding to the denial event.

The denial event may refer to an event of denial of response to the connection request, i.e., an event that the network denies establishment of a radio connection with the terminal. In one or more embodiments, when receiving the denial message corresponding to the connection request, the terminal may determine that a denial event corresponding to the connection request has occurred. The denial message may be adapted to indicating denial of response to the connection request.

For example, when the terminal initiates a connection establishment request to the network, if the terminal receives a connection establishment denial message corresponding to the connection establishment request, the terminal may determine that a denial event corresponding to the connection establishment request has occurred. When the terminal initiates a connection reestablishment request to the network, if the terminal receives a connection reestablishment denial message corresponding to the connection reestablishment request, the terminal may determine that a denial event corresponding to the connection reestablishment request has occurred. When the terminal initiates a connection restoration request to the network, if the terminal receives a connection restoration denial message corresponding to the connection restoration request, the terminal may determine that a denial event corresponding to the connection restoration request has occurred.

For example, the terminal may initiate a connection request to the first access network device. The terminal may receive a denial message corresponding to the connection request. The denial message may be sent by the first access network device. Alternatively, the denial message may be sent by another network device in the network that implements a DoS attack.

The event information corresponding to the denial event may be adapted to illustrating the denial event. In one or more embodiments, the event information may include event type indication information for identifying the denial event. The event type indication information may be an identifier. The identifier may be expressed as any one of a digit, a letter, a symbol, etc., or a combination thereof. The terminal may have to record multiple different events including the denial event. With the event type indication information, the denial event can be distinguished from another event. For example, different events may correspond to different event type indication information.

In addition, in an example, same event type indication information may correspond to a connection establishment request, a connection reestablishment request, a connection restoration request, etc. In another example, event type indication information corresponding to denial of response to a connection establishment request may be first indication information. Event type indication information corresponding to denial of response to a connection reestablishment request may be second indication information. Event type indication information corresponding to denial of response to a connection restoration request may be third indication information. The first indication information, the second indication information, and the third indication information may differ from each other. Thus, different indication information may be used to indicate different denial events.

In one or more embodiments, the event information may further include at least one of location information, time information, a cell identifier, a Public Land Mobile Network (PLMN) identifier, a cause of response denial, waiting time indicated by the network, a cause of connection establishment, or a request type. The location information may be adapted to indicating a location of the terminal at occurrence of the denial event. For instance, the location information may include latitude and longitude coordinates. The location information may further include a horizontal speed and/or a vertical speed. The time information may be adapted to indicating time of occurrence of the denial event. For instance, the time information may be expressed as a timestamp for a time point of occurrence of the denial event. The cell identifier may be adapted to indicating identifier information of a cell where the terminal is located at occurrence of the denial event. The PLMN[Patent1][EJ2] identifier may be adapted to indicating identifier information of a PLMN selected by the terminal at occurrence of the denial event. The cause of response denial may be adapted to indicating a cause of the network's denial of response to the connection request. Exemplarily, the cause of response denial may include network congestion, an integrity check failure, etc. The terminal may acquire the cause of response denial from the denial message. The waiting time indicated by the network may refer to time the terminal has to wait before re-initiating the connection request, as instructed by the network. The terminal may acquire the waiting time indicated by the network from the denial message. The cause of connection establishment may be adapted to indicating a cause of the terminal's request for establishment of the radio connection, such as an emergency service, data or signaling initiated by the terminal, etc. The request type may be adapted to indicating a type of the connection request initiated by the terminal. The request type may include the connection establishment request, the connection reestablishment request, the connection restoration request, etc.

In one or more embodiments, the terminal may record the event information in a storage device such as a cache.

In one or more embodiments, the terminal may record event information corresponding to a denial event corresponding to a connection request whenever the denial event occurs. The terminal may record multiple entries of event information, each corresponding to one denial event.

In one or more embodiments, a maximum of n entries of the event information may be recorded by the terminal. The n may be a positive integer. That is, the terminal may record a limited number of entries of event information. The n may be configured by the network. The n may be specified by a protocol. The n may be configured by the terminal. When the maximum number n is configured by the network, the terminal may send information on capability of the terminal to the network. The network may configure the maximum number n for the terminal according to the information on capability of the terminal. For example, the information on capability of the terminal may include a size of an available storage space of the terminal, such as a cache size.

In addition, when a maximum number of n entries of event information have been recorded by the terminal, in a possible implementation, in case of a new occurrence of the denial event, the terminal may no longer record event information corresponding to the new occurrence. In another possible implementation, in case of a new occurrence of the denial event, the terminal may delete event information corresponding to a recorded denial event, and record event information corresponding to the new occurrence. For example, the terminal may delete event information corresponding to an earliest denial event.

In addition, when recording the event information corresponding to the new occurrence, the terminal may keep event information corresponding to a recorded denial event, and add the event information corresponding to the new occurrence. Alternatively, the terminal may delete event information corresponding to a recorded denial event, and add the event information corresponding to the new occurrence, i.e., replace event information corresponding to a recorded denial event with the event information corresponding to the new occurrence.

In step 203, after the terminal has successfully attained access to the network, the terminal sends, to the network, an event report generated according to the event information.

In an embodiment herein, if the terminal has successfully attained access to the network, it may mean that the terminal has successfully established a radio connection such as an RRC connection with any access network device in the network. In one or more embodiments, when the terminal has successfully established a radio connection with a second access network device in the network, the terminal may send the event report to the second access network device. The second access network device may be the first access network device, or an access network device in the network other than the first access network device. The event report may be adapted to reporting the denial event to the network. Accordingly, the network learns, according to the event report, a possible security threat to the network, such as a DoS attack.

In one or more embodiments, the event information may include event type indication information. In one or more embodiments, the event information may further include at least one of location information, time information, a cell identifier, a Public Land Mobile Network (PLMN) identifier, a cause of response denial, waiting time indicated by the network, a cause of connection establishment, or a request type. Refer to the above for explanation of the various types of information, which is not repeated here. Note that the time information included in the event report may be adapted to indicating the time of occurrence of the denial event. The time information may be expressed as a timestamp for a time point of occurrence of the denial event. Alternatively, the time information may be expressed as a difference between a timestamp for a time point when the terminal sends the event report to the network and the timestamp for the time point of occurrence of the denial event.

In an example. Having successfully attained access to the network, the terminal may directly send the event report to the network. In another example. Having successfully attained access to the network, the terminal may send the event report to the network upon the network approval.

In one or more embodiments, after the terminal has successfully attained access to the network, the terminal may send an event reporting request to the network. The event reporting request may be adapted to requesting to send the event report to the network. The terminal may send, to the network, the event report generated according to the event information in response to receiving a confirmation of the event reporting request. For example, when the terminal has successfully established a radio connection with the second access network device in the network, the terminal may send the event reporting request to the second access network device. Upon receiving the event reporting request sent by the terminal, the network may determine that available event report has been recorded in the terminal and is to be reported. The network may determine whether to allow the terminal to report. If approving the terminal to report, the network may send a confirmation to the terminal to trigger sending the event report by the terminal to the network. In addition, if disapproving the terminal to report, the network may send a denial to the terminal, or send no response to the event reporting request. The terminal may decide not to send the event report to the network when receiving the denial or failing to receive a response to the event reporting request in time. In one or more embodiments, after the second access network device receives the event reporting request sent by the terminal, the second access network device may determine whether to allow the terminal to report. Alternatively, the second access network device may interact with a core network device. The core network device may then decide whether to allow the terminal to report. The core network device may send a decision to the terminal through the second access network device.

To sum up, with a technical solution herein, in response to occurrence of a denial event corresponding to the connection request, a terminal records event information corresponding to a denial event. Having successfully attained access to the network, the terminal sends, to the network, an event report generated according to the event information. Accordingly, the network learns, according to the event report, a possible security threat to the network, such as a DoS attack. Compared to manual collection and troubleshooting, a network collects information on a DoS attack reported by a terminal, reducing labor and time cost, improving efficiency.

Based on an embodiment in FIG. 2, the terminal may determine, according to configuration by the network, whether to record the event information corresponding to the denial event.

In an example, in response to occurrence of the denial event corresponding to the connection request, the terminal may detect whether the network has configured a Minimized Driving Test (MDT) function for the terminal. The terminal may record the event information corresponding to the denial event in response to detecting that the network has configured the MDT function for the terminal. If the network configures no MDT function for the terminal, the terminal does not have to record the event information corresponding to the denial event.

In one or more embodiments, the MDT function may be set according to different radio connection states. For example, in response to occurrence of the denial event corresponding to the connection request, the terminal may detect whether the network has configured the MDT function for the terminal in the idle state. If the network has configured the MDT function for the terminal in the idle state, the terminal may record the event information corresponding to the denial event. If the network configures no MDT function for the terminal in the idle state, the terminal does not have to record the event information corresponding to the denial event. As another example, in response to occurrence of the denial event corresponding to the connection request, the terminal may detect whether the network has configured the MDT function for the terminal in the connected state. If the network has configured the MDT function for the terminal in the connected state, the terminal may record the event information corresponding to the denial event. If the network configures no MDT function for the terminal in the connected state, the terminal does not have to record the event information corresponding to the denial event. As another example, in response to occurrence of the denial event corresponding to the connection request, the terminal may detect whether the network has configured the MDT function for the terminal in the inactive state. If the network has configured the MDT function for the terminal in the inactive state, the terminal may record the event information corresponding to the denial event. If the network configures no MDT function for the terminal in the inactive state, the terminal does not have to record the event information corresponding to the denial event.

In another example, in response to occurrence of the denial event corresponding to the connection request, the terminal may detect whether the network has configured, for the terminal, a function to record and report the denial event. The terminal may record the event information corresponding to the denial event in response to detecting that the network has configured, for the terminal, the function to record and report the denial event. If the network configures no function to record and report the denial event for the terminal, the terminal does not have to record the event information corresponding to the denial event.

In one or more embodiments, the function to record and report the denial event may be set according to different radio connection states. For example, in response to occurrence of the denial event corresponding to the connection request, the terminal may detect whether the network has configured the function to record and report the denial event for the terminal in the idle state. If the network has configured the function to record and report the denial event for the terminal in the idle state, the terminal may record the event information corresponding to the denial event. If the network configures no function to record and report the denial event for the terminal in the idle state, the terminal does not have to record the event information corresponding to the denial event. As another example, in response to occurrence of the denial event corresponding to the connection request, the terminal may detect whether the network has configured the function to record and report the denial event for the terminal in the connected state. If the network has configured the function to record and report the denial event for the terminal in the connected state, the terminal may record the event information corresponding to the denial event. If the network configures no function to record and report the denial event for the terminal in the connected state, the terminal does not have to record the event information corresponding to the denial event. As another example, in response to occurrence of the denial event corresponding to the connection request, the terminal may detect whether the network has configured the function to record and report the denial event for the terminal in the inactive state. If the network has configured the function to record and report the denial event for the terminal in the inactive state, the terminal may record the event information corresponding to the denial event. If the network configures no function to record and report the denial event for the terminal in the inactive state, the terminal does not have to record the event information corresponding to the denial event.

Note that before the terminal initiates a connection request to the network, the network may have configured the MDT function or the function to record and report the denial event for the terminal. For example, when the network monitors the presence of the terminal, or when the terminal initiates registration to the network, or when the terminal has completed the registration in the network, the network may configure the MDT function or the function to record and report the denial event for the terminal. In an embodiment herein, the network may configure the MDT function or the function to record and report the denial event for the terminal at any time. In addition, the MDT function or the function to record and report the denial event may be configured for the terminal by an access network device, a core network device, etc., which is not limited thereto herein.

In addition, the terminal may send the information on capability of the terminal to the terminal. The network may determine whether to configure the MDT function or the function to record and report the denial event for the terminal according to the information on capability of the terminal. For example, the information on capability of the terminal may include whether the terminal supports the MDT function or the function to record and report the denial event.

According to a technical solution herein, it may be determined, according to configuration by the network, whether the terminal records the event information corresponding to the denial event. Accordingly, the network side may effectively control information recording and reporting.

Based on an embodiment in FIG. 2 or an aforementioned option, when the terminal receives a denial message corresponding to the connection request, the terminal may detect whether integrity protection is applied to the denial message. The terminal may record the event information corresponding to the denial event in response to detecting that no integrity protection is applied to the denial message. In addition, in response to detecting that the integrity protection is applied to the denial message, the terminal does not have to record the event information corresponding to the denial event.

In one or more embodiments, the terminal in the inactive state may receive the denial message corresponding to the connection request, and may determine whether to record the event information corresponding to the denial event by detecting whether integrity protection is applied to the denial message.

In one or more embodiments, the terminal may detect whether integrity protection is applied to the denial message by detecting whether the denial message is sent through a Signaling Radio Bearer (SRB) 0. If the denial message is sent through the SRB0, the terminal may determine that no integrity protection is applied to the denial message. If the denial message is not sent through the SRB0, the terminal may determine that integrity protection is applied to the denial message.

In one or more embodiments, in response to detecting that the integrity protection is applied to the denial message, the terminal may perform integrity protection check on the denial message. The terminal may record the event information corresponding to the denial event in response to determining that the integrity protection check on the denial message fails. If the integrity protection check on the denial message is successful, the terminal does not have to record the event information corresponding to the denial event. When the integrity protection check is successful, it means that the denial message received by the terminal is sent by a legitimate access network device and no DoS attack exists, and thus the terminal does not have to record the event information corresponding to the denial event.

According to a technical solution herein, the terminal may determine whether to record the event information corresponding to the denial event by determining whether integrity protection is applied to the denial message as well as whether the integrity protection check succeeds. Accordingly, recording of the denial event initiated by a legitimate access network device is prevented effectively, improving the pertinence and effectiveness of event recording.

Based on an embodiment in FIG. 2 or an aforementioned option, the terminal may further acquire a number of denials and/or total time. The number of denials may refer to a number of occurrences of the denial event. The total time may refer to a time span since a first occurrence of the denial event till a last occurrence of the denial event. In one or more embodiments, the event report may further include the number of denials and/or the total time.

In a possible implementation, the number of denials corresponding to a cell, a UMTS Terrestrial Radio Access Network (UTRAN) registered area, or a tracking area may be counted. Similarly, the total time corresponding to a cell, a UTRAN registered area, or a tracking area may be counted. For example, the number of denials corresponding to a cell may be counted as follows. The terminal may count the number of denials of response to the connection request initiated in a respective cell, and indicate, in the event report, numbers of denials having occurred in respective cells.

Understandably, in other possible implementations, the number of denials may be counted according to a criterion other than according to respective cells, respective UTRAN registered areas, or respective tracking areas. The terminal may count an overall number of denials and total time.

Note that the number of denials and the total time may be counted till the terminal determines that an event report is to be sent to the network. Having acquired the number of denials and/or the total time, the terminal may send the event report to the network.

According to a technical solution herein, the terminal counts the number of denials and/or the total time, and include the number of denials and/or the total time in the event report. Accordingly, the network learns the number of denials and/or the total time, providing more effective information and help for troubleshooting a DoS attack.

Based on an embodiment in FIG. 2 or an aforementioned option, the terminal may further acquire a total number of denials. The total number of denials may refer to a total number of occurrences of the denial event during a target time period. The terminal may send, to the network, the event report generated according to the event information in response to determining that the total number of denials is greater than a preset threshold. The target time period as well as the preset threshold may be configured by the network, specified by a protocol, or configured by the terminal.

In one or more embodiments, the terminal may acquire the total number of denials during each of multiple target time periods. Then, durations of two such adjacent target time periods may or may not be the same. For example, each target time period may have the same duration of 30 minutes. As another example, durations of two adjacent target time periods may differ, such as be 10 minutes and 20 minutes, respectively. The duration of a target time period configured by the network, specified by a protocol, or configured by the terminal, which is not limited thereto herein.

In addition, the terminal may reset the total number of denials duly. In an example, the terminal may reset the total number of denials in response to a change in a radio connection state of the terminal. The radio connection state may include at least two of an idle state, a connected state, or an inactive state. For example, when the terminal switches the radio connection state between any two of the idle state, the connected state, or the inactive state, the terminal may reset the total number of denials. In another example, the terminal may reset the total number of denials in response to determining that the terminal switches between a first state and a second state. The first state may include the connected state. The second state may include the idle state and/or the inactive state. That is, when the terminal switches the radio connection state between the connected state and the idle state, or between the connected state and the inactive state, the terminal may reset the total number of denials. However, when the terminal switches the radio connection state between the idle state and the inactive state, the total number of denials does not have to be reset.

According to a technical solution herein, the terminal counts a total number of denials during a target time period. The terminal determines, based on the total number of denials, whether to send an event report to the network. Accordingly, information is reported to the network in case of a serious DoS attack, such that the network handles and troubleshoots the attack preferentially.

A device embodiment herein set forth below may be adapted to implementing a method embodiment herein. One may refer to a method embodiment herein for a detail not disclosed in a device embodiment herein.

Figure 3:
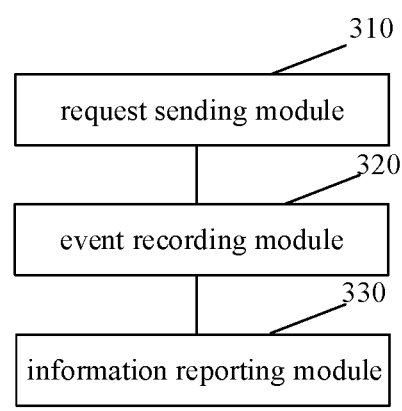
FIG. 3 is a block diagram of an apparatus for reporting information according to an embodiment.

FIG. 3 is a block diagram of an apparatus for reporting information according to an embodiment. The apparatus may serve to implement an aforementioned method example, such as by hardware, or by executing corresponding software by hardware, etc. The apparatus may apply to a terminal. The apparatus may include a request sending module 310, an event recording module 320, and an information reporting module 330.

The request sending module 310 is adapted to sending a connection request. The connection request is adapted to requesting establishment of a radio connection with an access network device in a network.

The event recording module 320 is adapted to, in response to occurrence of a denial event corresponding to the connection request, recording event information corresponding to the denial event. The denial event refers to an event of denial of response to the connection request.

The information reporting module 330 is adapted to, after the terminal has successfully attained access to the network, sending, to the network, an event report generated according to the event information.

To sum up, with a technical solution herein, in response to occurrence of a denial event corresponding to the connection request, a terminal records event information corresponding to a denial event. Having successfully attained access to the network, the terminal sends, to the network, an event report generated according to the event information. Accordingly, the network learns, according to the event report, a possible security threat to the network, such as a DoS attack. Compared to manual collection and troubleshooting, a network collects information on a DoS attack reported by a terminal, reducing labor and time cost, improving efficiency.

Based on an embodiment in FIG. 3, the event information may include event type indication information for identifying the denial event.

In one or more embodiments, the event information may further include at least one of location information, time information, a cell identifier, a Public Land Mobile Network (PLMN) identifier, a cause of response denial, waiting time indicated by the network, a cause of connection establishment, or a request type.

Based on an embodiment in FIG. 3 or an aforementioned option, a maximum of n entries of the event information may be recorded by the terminal. Each entry of the n entries of the event information may correspond to one denial event. The n may be a positive integer.

In one or more embodiments, the n may be configured by the network. Alternatively, the n may be specified by a protocol. Alternatively, the n may be configured by the terminal.

Based on an embodiment in FIG. 3 or an aforementioned option, the apparatus may further include a first detecting module (not shown in the figure).

The first detecting module may be adapted to, in response to occurrence of the denial event corresponding to the connection request, detecting whether the network has configured a Minimized Driving Test (MDT) function for the terminal.

The event recording module 320 may be further adapted to recording the event information corresponding to the denial event in response to detecting that the network has configured the MDT function for the terminal.

Based on an embodiment in FIG. 3 or an aforementioned option, the apparatus may further include a second detecting module (not shown in the figure).

The second detecting module may be adapted to, in response to occurrence of the denial event corresponding to the connection request, detecting whether the network has configured, for the terminal, a function to record and report the denial event.

The event recording module 320 may be further adapted to recording the event information corresponding to the denial event in response to detecting that the network has configured, for the terminal, the function to record and report the denial event.

Based on an embodiment in FIG. 3 or an aforementioned option, the apparatus may further include a report requesting module (not shown in the figure).

The report requesting module may be adapted to, after the terminal has successfully attained access to the network, sending an event reporting request to the network. The event reporting request may be adapted to requesting to send the event report to the network.

The information reporting module 330 may be further adapted to sending, to the network, the event report generated according to the event information in response to receiving a confirmation of the event reporting request.

Based on an embodiment in FIG. 3 or an aforementioned option, the apparatus may further include a message receiving module and a third detecting module (not shown in the figure).

The message receiving module may be adapted to receiving a denial message corresponding to the connection request, the denial message being adapted to indicating denial of response to the connection request.

The third detecting module may be adapted to detecting whether integrity protection is applied to the denial message.

The event recording module 320 may be further adapted to recording the event information corresponding to the denial event in response to detecting that no integrity protection is applied to the denial message.

In one or more embodiments, the apparatus may further include a fourth detecting module (not shown in the figure).

The fourth detecting module may be adapted to, in response to detecting that the integrity protection is applied to the denial message, performing integrity protection check on the denial message.

The event recording module 320 may be further adapted to recording the event information corresponding to the denial event in response to determining that the integrity protection check on the denial message fails.

Based on an embodiment in FIG. 3 or an aforementioned option, the apparatus may further include a first counting module (not shown in the figure).

The counting module may be adapted to acquiring a number of denials and/or total time, the number of denials referring to a number of occurrences of the denial event, the total time referring to a time span since a first occurrence of the denial event till a last occurrence of the denial event.

The event report may include the number of denials and/or the total time.

In one or more embodiments, the number of denials and/or the total time corresponding to a cell, a UMTS Terrestrial Radio Access Network (UTRAN) registered area, or a tracking area may be counted.

Based on an embodiment in FIG. 3 or an aforementioned option, the apparatus may further include a second counting module (not shown in the figure).

The second counting module may be adapted to acquiring a total number of denials. The total number of denials may refer to a total number of occurrences of the denial event during a target time period.

The event recording module 330 may be further adapted to sending, to the network, the event report generated according to the event information in response to determining that the total number of denials is greater than a preset threshold.

In one or more embodiments, the apparatus may further include a resetting module (not shown in the figure).

The resetting module may be adapted to, in response to a change in a radio connection state of the terminal, resetting the total number of denials. The radio connection state may include at least two of an idle state, a connected state, or an inactive state.

Alternatively, the resetting module may be adapted to, in response to determining that the terminal switches between a first state and a second state, resetting the total number of denials. The first state may include the connected state. The second state may include the idle state and/or the inactive state.

Note that division of the functional modules in implementing the function of the apparatus according to the embodiment is merely illustrative. In application, the function may be allocated to be carried out by different functional modules as needed. That is, a content structure of the device may be divided into different functional modules for carrying out all or part of the function.

Refer to an exemplary method herein for elaboration of a way a module of the apparatus herein executes an operation, which is not repeated here.

An embodiment herein further provides a terminal capable of implementing a method herein for reporting information. The terminal may include a processor and memory adapted to storing an instruction executable by the processor. The processor is adapted to:

sending a connection request, the connection request being adapted to requesting establishment of a radio connection with an access network device in a network;

in response to occurrence of a denial event corresponding to the connection request, recording event information corresponding to the denial event, the denial event referring to an event of denial of response to the connection request; and after the terminal has successfully attained access to the network, sending, to the network, an event report generated according to the event information.

In one or more embodiments, the event information may include event type indication information for identifying the denial event.

In one or more embodiments, the event information may further include at least one of location information, time information, a cell identifier, a Public Land Mobile Network (PLMN) identifier, a cause of response denial, waiting time indicated by the network, a cause of connection establishment, or a request type.

In one or more embodiments, a maximum of n entries of the event information may be recorded by the terminal. Each entry of the n entries of the event information may correspond to one denial event. The n may be a positive integer.

In one or more embodiments, the n may be configured by the network. Alternatively, the n may be specified by a protocol. Alternatively, the n may be configured by the terminal.

In one or more embodiments, the processor may be further adapted to:

in response to occurrence of the denial event corresponding to the connection request, detecting whether the network has configured a Minimized Driving Test (MDT) function for the terminal; and recording the event information corresponding to the denial event in response to detecting that the network has configured the MDT function for the terminal.

In one or more embodiments, the processor may be further adapted to:

in response to occurrence of the denial event corresponding to the connection request, detecting whether the network has configured, for the terminal, a function to record and report the denial event; and recording the event information corresponding to the denial event in response to detecting that the network has configured, for the terminal, the function to record and report the denial event.

In one or more embodiments, the processor may be further adapted to:

after the terminal has successfully attained access to the network, sending an event reporting request to the network, the event reporting request being adapted to requesting to send the event report to the network; and sending, to the network, the event report generated according to the event information in response to receiving a confirmation of the event reporting request.

In one or more embodiments, the processor may be further adapted to:

receiving a denial message corresponding to the connection request, the denial message being adapted to indicating denial of response to the connection request;

detecting whether integrity protection is applied to the denial message; and recording the event information corresponding to the denial event in response to detecting that no integrity protection is applied to the denial message.

In one or more embodiments, the processor may be further adapted to:

in response to detecting that the integrity protection is applied to the denial message, performing integrity protection check on the denial message; and recording the event information corresponding to the denial event in response to determining that the integrity protection check on the denial message fails.

In one or more embodiments, the processor may be further adapted to:

acquiring a number of denials and/or total time. The number of denials may refer to a number of occurrences of the denial event. The total time may refer to a time span since a first occurrence of the denial event till a last occurrence of the denial event.

The event report may include the number of denials and/or the total time.

In one or more embodiments, the number of denials and/or the total time corresponding to a cell, a UMTS Terrestrial Radio Access Network (UTRAN) registered area, or a tracking area may be counted.

In one or more embodiments, the processor may be further adapted to:

acquiring a total number of denials, the total number of denials referring to a total number of occurrences of the denial event during a target time period; and sending, to the network, the event report generated according to the event information in response to determining that the total number of denials is greater than a preset threshold.

In one or more embodiments, the processor may be further adapted to:

in response to a change in a radio connection state of the terminal, resetting the total number of denials, the radio connection state including at least two of an idle state, a connected state, or an inactive state; or in response to determining that the terminal switches between a first state and a second state, resetting the total number of denials, the first state including the connected state, the second state including the idle state and/or the inactive state.

A solution herein has been described herein mainly from a terminal side. Understandably, a terminal may include a hardware structure and/or a software module for implementing a function herein. Combining an exemplary unit as well as an exemplary algorithm step disclosed herein, embodiments herein may be implemented by hardware or a combination of hardware and computer software. Whether a function is implemented by hardware or by computer software driven hardware may depend on a specific application of a technical solution as well as a design constraint. Depending on a specific application, a person having ordinary skill in the art may implement a described function using different methods. Such implementation however should not be deemed going beyond a scope of a technical solution herein.

Figure 4:
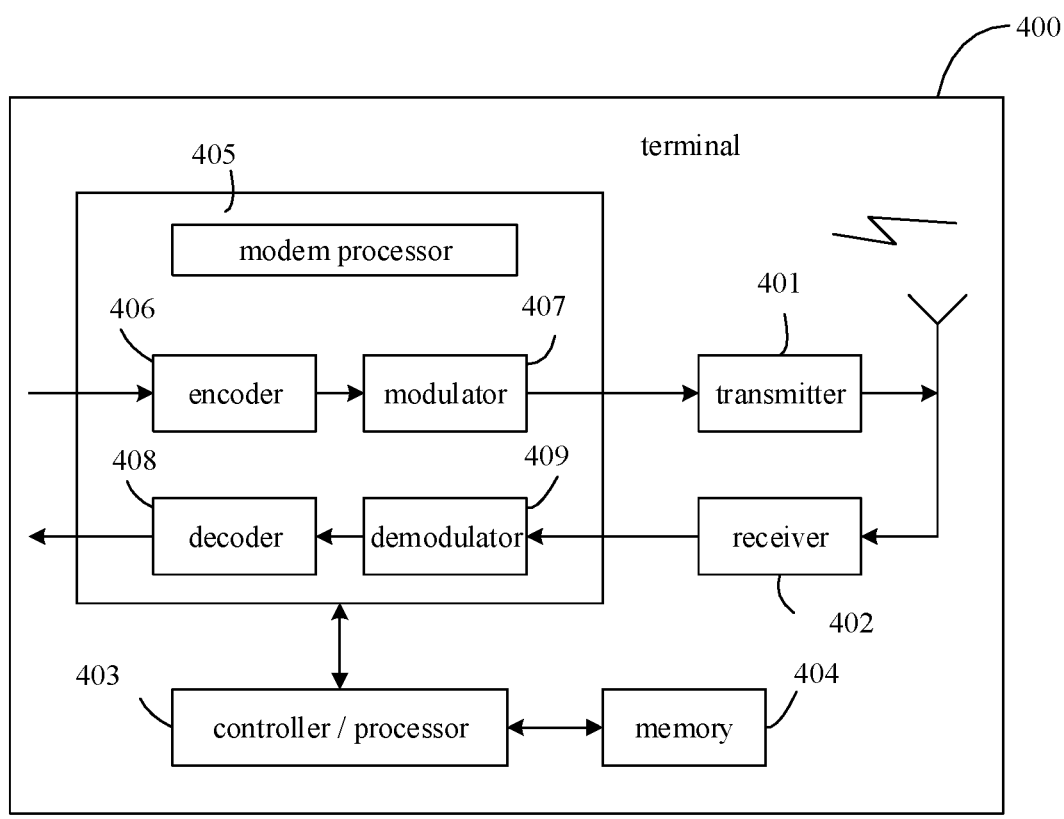
FIG. 4 is a diagram of a structure of a terminal according to an embodiment.

FIG. 4 is a diagram of a structure of a terminal according to an embodiment.

The terminal 400 may include a transmitter 401, a receiver 402, and a processor 403. The processor 403 may also be a controller, represented as "controller/processor 403" in FIG. 4. In one or more embodiments, the terminal 400 may further include a modem processor 405. The modem processor 405 may include an encoder 406, a modulator 407, a decoder 408, and a demodulator 409.

In an example, the transmitter 401 may adjust an output sample (such as by analog conversion, filtration, amplification, up-conversion, etc.) and generate an uplink signal. The uplink signal may be transmitted to an access network device via an antenna. On a downlink, the antenna may receive a downlink signal transmitted by the access network device. The receiver 402 may adjust a signal sent by the antenna (such as by filtration, amplification, down-conversion, digitalization, etc.) and provide an input sample. In the modem processor 405, the encoder 406 may receive service data and a signaling message to be sent uplink, and may process (e.g., format, encode, interleave, etc.) the service data and the signaling message. The modulator 407 may further process the encoded service data and signaling message (such as by symbol mapping, modulation, etc.) and provide an output sample. The demodulator 409 may process (e.g., demodulate) the input sample and provide symbol estimation. The decoder 408 may process (e.g., de-interleave, decode, etc.) the symbol estimation and provide decoded data and signaling message sent to the terminal 400. The encoder 406, the modulator 407, the demodulator 409, and the decoder 408 may be implemented by a synthetic modem processor 405. These units may perform processing according to radio access technology (such as LTE, access technology of another evolved system, etc.) adopted by a radio access network. Note that when the terminal 400 does not include the modem processor 405, said function of the modem processor 405 may instead be performed by the processor 403.

The processor 403 may control and manage a move of the terminal 400, and may be adapted to implement a process performed by the terminal 400 herein. For example, the processor 403 may be further adapted to implement a step at a terminal side in a method embodiment herein, and/or another step of a technical solution illustrated herein.

The terminal 400 may further include memory 404. The memory 404 may be adapted to storing a program code and data used in the terminal 400.

A processor adapted to implementing a function of the terminal herein may be a Central Processing Unit (CPU), a universal processor, a Digital Signal Processor (DSP), an Application-Specific Integrated Circuit (ASIC), a Field Programmable Gate Array (FPGA), or another programmable logic device, transistor logic device, hardware component, etc., or any combination thereof. The processor may implement or execute various exemplary logic block diagrams, modules, circuits, etc., illustrated in combination with content disclosed herein. The processor may also be a combination for implementing a computing function, such as a combination including one or more microprocessors, a combination of a DSP and a microprocessor, etc.

A step of a method or an algorithm illustrated in combination with content disclosed herein may be implemented as hardware, processor executed software instructions, etc. A software instruction may consist of a corresponding software module. A software module may be stored in Random Access Memory (RAM), flash memory, Read Only Memory (ROM), Erasable Programmable ROM (EPROM), Electrically EPROM (EEPROM), a register, a hard disk, a mobile hard disk, Compact Disc Read-Only Memory (CD-ROM), or a storage medium of any other form known in the art, etc. An exemplary storage medium may be coupled to the processor, allowing the processor to read information from the storage medium and write information to the storage medium. Understandably, the storage medium may also be a component of the processor. The processor and the storage medium may be located in an ASIC. In addition, the ASIC may be located in the terminal. Understandably, the processor and the storage medium may also exist in the terminal as separate components.

A person having ordinary skill in the art may realize that a function illustrated herein may be implemented by hardware, software, firmware, or any combination thereof in the one or more examples herein. When implemented by software, such a function may be stored in a computer-readable medium, or transmitted as one or more instructions or codes on the computer-readable medium. The computer-readable medium may include a computer storage medium, a communication medium, etc. The communication medium may include any medium that facilitates transmitting a computer program from one place to another. The storage medium may be any available medium accessible by a universal or dedicated computer.

According to an embodiment herein, a non-transitory computer-readable storage medium has stored thereon a computer program which, when executed by a processor, implements a method herein for reporting information.

Herein by "multiple", it may mean two or more. A term "and/or" may describe an association between associated objects, including three possible relationships. For example, by A and/or B, it may mean that there may be three cases, namely, existence of but A, existence of both A and B, or existence of but B. A slash mark "/" may generally denote an "or" relationship between two associated objects that come respectively before and after the mark per se.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A method for reporting information, comprising:
    sending, by a terminal, a connection request, the connection request requesting to establish a radio connection with an access network device in a network;
    receiving, by the terminal, a denial message corresponding to the connection request, the denial message indicating denial of response to the connection request
    detecting, by the terminal, whether integrity protection is applied to the denial message,
    in response to detecting that no integrity protection is applied to the denial message, recording, by the terminal, event information corresponding to a denial event;
    in response to occurrence of the denial event corresponding to the connection request, recording, by the terminal, the event information corresponding to the denial event, the denial event referring to an event of denial of response to the connection request; and
    after the terminal has successfully attained access to the network, sending, by the terminal, to the network, an event report generated according to the event information.

2. The method of claim 1, wherein the event information comprises event type indication information for identifying the denial event.

3. The method of claim 2, wherein the event information further comprises at least one of following parameters: location information, time information, a cell identifier, a Public Land Mobile Network (PLMN) identifier, a cause of response denial, waiting time indicated by the network, a cause of connection establishment, or a request type.

4. The method of claim 1, wherein a maximum of n entries of the event information are recorded by the terminal, wherein each entry of the n entries of the event information corresponds to one denial event, and wherein n is a positive integer.

5. The method of claim 4, wherein n is determined by one of followings:
    n is configured by the network,
    n is specified by a protocol, or
    n is configured by the terminal.

6. The method of claim 1, further comprising:
    in response to occurrence of the denial event corresponding to the connection request, detecting, by the terminal, whether the network has configured a Minimized Driving Test (MDT) function for the terminal, and
    in response to detecting that the network has configured the MDT function for the terminal, recording, by the terminal, the event information corresponding to the denial event.

7. The method of claim 1, further comprising:
    in response to occurrence of the denial event corresponding to the connection request, detecting, by the terminal, whether the network has configured, for the terminal, a function to record and report the denial event, and
    in response to detecting that the network has configured, for the terminal, the function to record and report the denial event, recording, by the terminal, the event information corresponding to the denial event.

8. The method of claim 1, further comprising:
    after the terminal has successfully attained access to the network, sending, by the terminal, an event reporting request to the network, the event reporting request requesting to send the event report to the network, and
    in response to receiving a confirmation of the event reporting request, sending, by the terminal, to the network, the event report generated according to the event information.

9. The method of claim 1, further comprising:
    in response to detecting that the integrity protection is applied to the denial message, performing, by the terminal, integrity protection check on the denial message, and
    in response to determining that the integrity protection check on the denial message fails, recording, by the terminal, the event information corresponding to the denial event.

10. The method of claim 1, further comprising:
    acquiring, by the terminal, a number of denials, total time, or the number of denials and the total time, the number of denials referring to a number of occurrences of the denial event, the total time referring to a time span since a first occurrence of the denial event till a last occurrence of the denial event,
    wherein the event report comprises the number of denials and the total time.

11. The method of claim 10, wherein the number of denials or the total time is counted corresponding to any one of following parameters: a cell, a UMTS Terrestrial Radio Access Network (UTRAN) registered area, or a tracking area.

12. The method of claim 1, further comprising:
    acquiring, by the terminal, a total number of denials, the total number of denials referring to a total number of occurrences of the denial event during a target time period, and
    in response to determining that the total number of denials is greater than a preset threshold, sending by the terminal, to the network, the event report generated according to the event information.

13. The method of claim 12, further comprising:
in response to determining a change in a radio connection state of the terminal, resetting the total number of denials, wherein the radio connection state comprises at least two of following states: an idle state, a connected state, or an inactive state; or
in response to determining that the terminal switches between a first state and a second state, resetting the total number of denials, wherein the first state comprises the connected state, and wherein the second state comprises the idle state and the inactive state.

14. A non-transitory computer-readable storage medium, having stored thereon a computer program which, when executed by a processor, implements the method of claim 1.

15. An apparatus for reporting information, applied to a terminal, comprising:
one or more processors;
a non-transitory storage coupled to the one or more processors; and
a plurality of programs stored in the non-transitory storage that, when executed by the one or more processors, cause the apparatus to perform acts comprising:
sending a connection request, the connection request requesting to establish a radio connection with an access network device in a network,
receiving a denial message corresponding to the connection request, the denial message indicating denial of response to the connection request,
detecting whether integrity protection is applied to the denial message,
recording event information corresponding to a denial event in response to detecting that no integrity protection is applied to the denial message,
in response to occurrence of the denial event corresponding to the connection request, recording the event information corresponding to the denial event, the denial event referring to an event of denial of response to the connection request, and
after the terminal has successfully attained access to the network, sending, to the network, an event report generated according to the event information.

16. The apparatus of claim 15, wherein the event information comprises event type indication information for identifying the denial event.

17. The apparatus of claim 16, wherein the event information further comprises at least one of following parameters: location information, time information, a cell identifier, a Public Land Mobile Network (PLMN) identifier, a cause of response denial, waiting time indicated by the network, a cause of connection establishment, or a request type.

18. The apparatus of claim 15, wherein a maximum of n entries of the event information are recorded by the terminal, wherein each entry of the n entries of the event information corresponds to one denial event, and wherein n is a positive integer.

19. The apparatus of claim 18, wherein n is determined by one of followings:
n is configured by the network,
n is specified by a protocol, or
n is configured by the terminal.

20. The apparatus of claim 15, wherein the plurality of programs stored in the non-transitory storage that, when executed by the one or more processors, cause the apparatus to perform acts further comprising:
in response to occurrence of the denial event corresponding to the connection request, detecting whether the network has configured a Minimized Driving Test (MDT) function for the terminal, and
recording the event information corresponding to the denial event in response to detecting that the network has configured the MDT function for the terminal.

21. The apparatus of claim 15, wherein the plurality of programs stored in the non-transitory storage that, when executed by the one or more processors, cause the apparatus to perform acts further comprising:
in response to occurrence of the denial event corresponding to the connection request, detecting whether the network has configured, for the terminal, a function to record and report the denial event, and
recording the event information corresponding to the denial event in response to detecting that the network has configured, for the terminal, the function to record and report the denial event.

22. The apparatus of claim 15, wherein the plurality of programs stored in the non-transitory storage that, when executed by the one or more processors, cause the apparatus to perform acts further comprising:
after the terminal has successfully attained access to the network, sending an event reporting request to the network, the event reporting request requesting to send the event report to the network, and
sending, to the network, the event report generated according to the event information in response to receiving a confirmation of the event reporting request.

23. The apparatus of claim 15, wherein the plurality of programs stored in the non-transitory storage that, when executed by the one or more processors, cause the apparatus to perform acts further comprising:
in response to detecting that the integrity protection is applied to the denial message, performing integrity protection check on the denial message, and
recording the event information corresponding to the denial event in response to determining that the integrity protection check on the denial message fails.

24. The apparatus of claim 15, wherein the plurality of programs stored in the non-transitory storage that, when executed by the one or more processors, cause the apparatus to perform acts further comprising:
acquiring a number of denials, total time, or the number of denials and the total time, the number of denials referring to a number of occurrences of the denial event, the total time referring to a time span since a first occurrence of the denial event till a last occurrence of the denial event, and
wherein the event report comprises the number of denials and the total time.

25. The apparatus of claim 24, wherein the number of denials or the total time is counted corresponding to any one of following parameters: a cell, a UMTS Terrestrial Radio Access Network (UTRAN) registered area, or a tracking area.

26. The apparatus of claim 15, wherein the plurality of programs stored in the non-transitory storage that, when executed by the one or more processors, cause the apparatus to perform acts further comprising:
acquiring a total number of denials, the total number of denials referring to a total number of occurrences of the denial event during a target time period, and
sending, to the network, the event report generated according to the event information in response to determining that the total number of denials is greater than a preset threshold.

27. The apparatus of claim 26, wherein the plurality of programs stored in the non-transitory storage that, when executed by the one or more processors, cause the apparatus to perform acts further comprising:

in response to a change in a radio connection state of the terminal, resetting the total number of denials, wherein the radio connection state comprises at least two of following states: an idle state, a connected state, or an inactive state; or in response to determining that the terminal switches between a first state and a second state, resetting the total number of denials, wherein the first state comprises the connected state, and wherein the second state comprises the idle state and the inactive state.

28. A terminal, comprising a processor and memory, wherein the memory is adapted to storing an instruction executable by the processor, wherein the processor is adapted to:

sending a connection request, the connection request requesting to establish a radio connection with an access network device in a network;

receiving a denial message corresponding to the connection request, the denial message indicating denial of response to the connection request detecting whether integrity protection is applied to the denial message, in response to detecting that no integrity protection is applied to the denial message, recording event information corresponding to a denial event in response to occurrence of the denial event corresponding to the connection request, recording the event information corresponding to the denial event, the denial event referring to an event of denial of response to the connection request; and after the terminal has successfully attained access to the network, sending, to the network, an event report generated according to the event information.

* * * * *